United States Patent [19]
Morris

[11] 3,881,619
[45] May 6, 1975

[54] FIFTH WHEEL DEVICE

[76] Inventor: Wallace T. Morris, 35264 Grover Rd., Eastlake, Ohio 44094

[22] Filed: Sept. 27, 1973

[21] Appl. No.: 401,389

[52] U.S. Cl. ............... 214/620; 188/67; 280/415 A
[51] Int. Cl. ..................... B66f 9/12; B62d 53/08
[58] Field of Search .......... 214/145, 372, 620, 621, 214/750; 280/415 R, 415 A, 423 R, 433; 188/67

[56] References Cited
UNITED STATES PATENTS

| | | | |
|---|---|---|---|
| 2,490,772 | 12/1949 | Benner | 214/620 |
| 2,637,453 | 5/1953 | Cleveland | 280/423 R X |
| 2,809,759 | 10/1957 | Manker | 214/620 |
| 2,988,058 | 6/1961 | Warnecke | 188/67 X |
| 3,250,506 | 5/1966 | Thouvenelle et al. | 380/433 X |
| 3,552,557 | 1/1971 | Green | 214/621 |
| 3,593,672 | 7/1971 | Breen et al. | 214/621 X |

FOREIGN PATENTS OR APPLICATIONS

| | | | |
|---|---|---|---|
| 814,808 | 6/1969 | Canada | 214/145 |
| 780,410 | 7/1957 | United Kingdom | 214/145 |

Primary Examiner—Robert J. Spar
Assistant Examiner—L. J. Paperner
Attorney, Agent, or Firm—Teare, Teare & Sammon

[57] ABSTRACT

A portable self-contained fifth wheel device for detachable mounting on a vehicle for pulling a wheeled container comprising a frame for detachable connection on a wheeled vehicle of the type having at least one support arm with the frame including a pivotally mounted support member for detachable connection to a wheeled container. The frame has at least one interlocking member including a hollow housing in the form of a guide track for slidably receiving the support arm, and the housing includes a fluid actuated lock means for selective locking engagement with the support arm for supportably mounting the container on the fifth wheel device.

15 Claims, 8 Drawing Figures

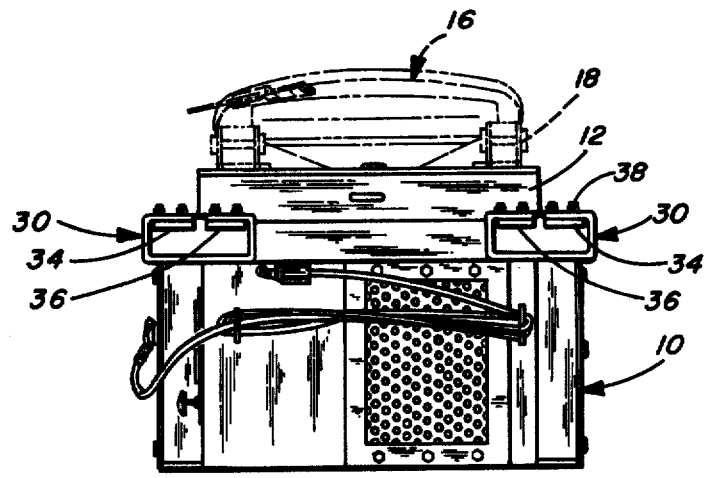
FIG. 4
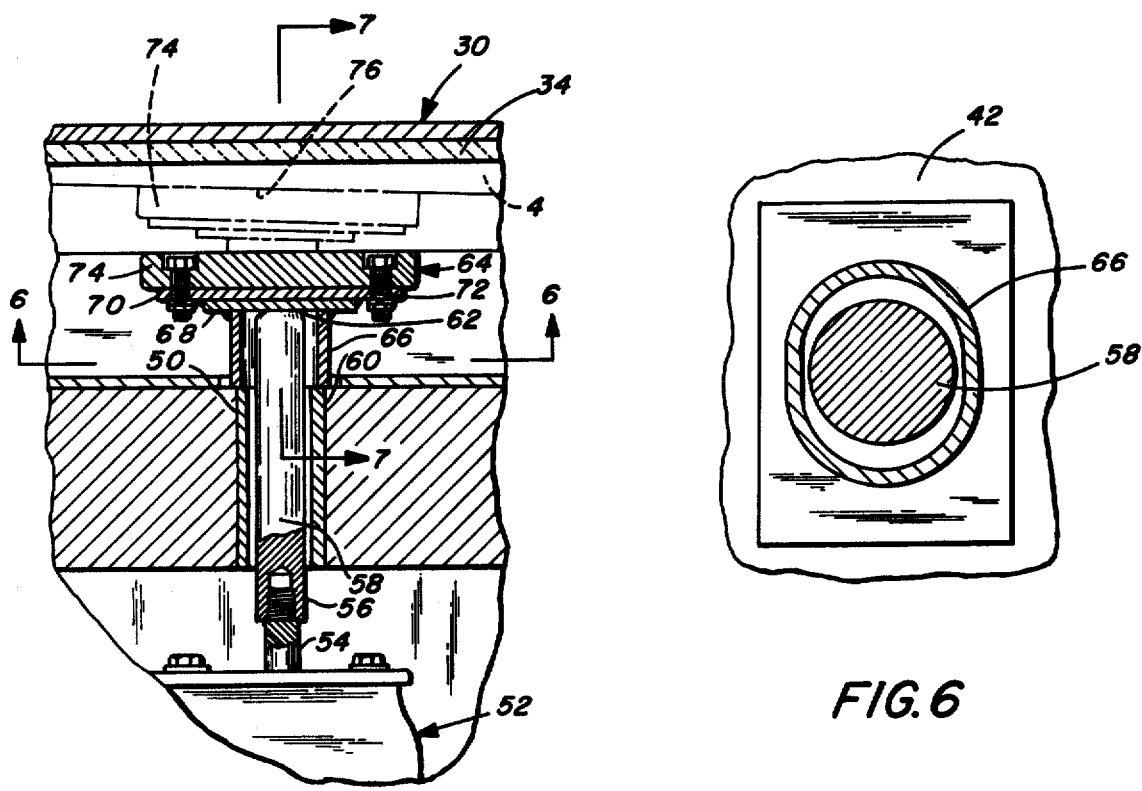
FIG. 5
FIG. 6

FIFTH WHEEL DEVICE

BACKGROUND OF THE INVENTION

The present invention relates in general to a fifth wheel device for mounting on a vehicle for towing a wheeled container, and more specifically relates to a novel portable, self-contained fifth wheel device for detachable mounting on a vehicle, such as a fork lift truck or the like, for pulling a wheeled container, such as a trailer. Such fifth wheel device has particular application, for example, in moving trailers of the tractor-trailer type from one location to another, such as in dock areas, freight terminals, and at other such locations where tractor-type trailer units are employed for the transportation of cargo.

Heretofore, trailers of the type employed with tractor-trailer units have been moved from location-to-location at the loading and/or unloading areas primarily either by large type cranes or by specially designed tractor units having a fifth wheel for engagement with the trailer chassis. It will be appreciated that such large type cranes are not only costly from an initial investment and maintenance standpoint, but also are not sufficiently efficient for quick and easy movement or "spotting" of the trailers since they are relatively slow moving and oftentimes, due to their size, cannot be used in areas where space is at a premium. In addition, such cranes require highly skilled operators and oftentimes cannot handle extremely heavy cargo loads held by the containers. Although fifth-wheel type tractors may be employed for moving and "spotting" the trailers, such vehicles are relatively expensive and again require the use of special operators. Accordingly, should such type of equipment break down, there results considerably increased cost by reason of the down-time encountered in order to repair such vehicles resulting in costly in delays in loading and/or unloading the cargo from ships, trains and the like. Moreover, due to the vital time schedules involved with present day transportation facilities, it is imperative that the cargo be loaded and/or unloaded with the minimum time and effort within the given time schedule.

BRIEF DESCRIPTION OF THE DRAWINGS

FIG. 4 is a rear elevation view of the fifth wheel device of the invention;

FIG. 5 is a fragmentary, vertical section view, on an enlarged scale, illustrating the locking arrangement of the invention for engagement with the support arm, (guide line) of a lift truck;

FIG. 6 if a fragmentary section view taken along the line 6—6 of FIG. 5, but rotated 90°;

DESCRIPTION OF THE PREFERRED EMBODIMENTS

Figure 1:
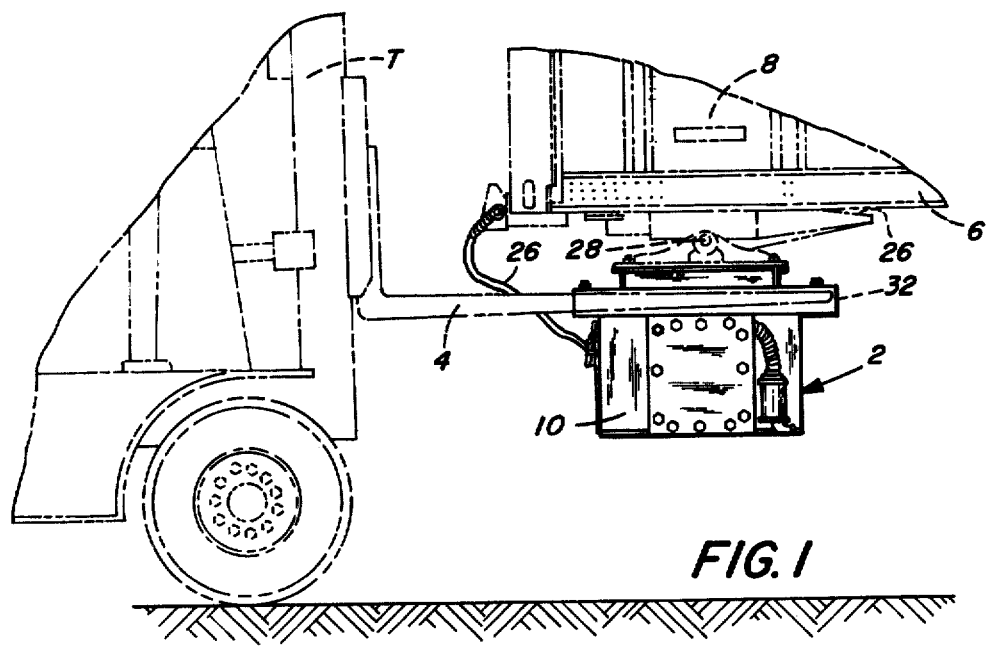
FIG. 1 is a fragmentary, side elevation view illustrating a conventional type fork lift truck (guide line) for mounting the fifth wheel device of the invention for moving the chassis of a trailer (guide line)

Referring again to the drawings and in particular to FIG. 1 thereof, there is designated, generally at 2, the fifth wheel device of the present invention mounted for detachable connection on a support arm 4 of a conventional type lift truck for detachably supporting a conventional type trailer tractor 6 of the type which conventionally mounts a removable container 8 for holding cargo or the like. Although the fifth wheel device 2 has been illustrated for use in detachably mounting on a pair of arms of a fork lift truck, it is understood that other types of vehicles having similar arms may be employed with the fifth wheel device of the invention for use in detachable connection with various types of wheeled cargo carrying trailers.

Figure 2:
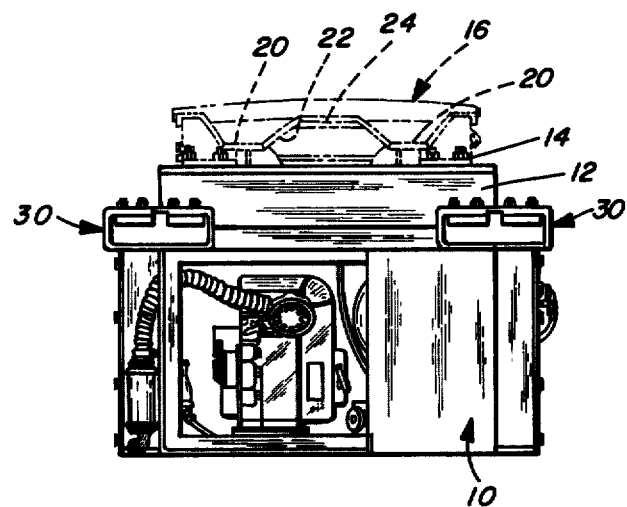
FIG. 2 is a front elevation view of the fifth wheel device of the invention.

In the form shown, the fifth wheel device 2 includes a fabricated metal housing 10 made from sheet metal so as to provide a generally polygonal box-like construction. The frame, or housing 10, includes an upper support bracket 12 which may be secured thereto by suitable weldments, fasteners, or the like. The bracket structure 12, in turn, mounts a fifth wheel member 16 which may be detachably mounted on the bracket 12, as at 14, via suitable bolts or the like, as best seen in FIG. 2. The fifth wheel member 16, in the embodiment shown, is pivotally mounted, as at 18, to the bracket structure 12 and includes a pair of operably disposed cam members 20 which are spaced apart by a suitable tapered slot, as at 22, which slot is provided a its rearward end with an aperture 24 (FIG. 2) for receiving a pin element (not shown) which projects downwardly from the chassis 6 of the trailer for detachable locking of the trailer on the fifth wheel in a manner as known in the art. As illustrated in FIG. 1, the support members 20 may be tapered downwardly and outwardly, as at 26, to facilitate sliding coacting engagement with the confronting undersurface of the chassis 6 to facilitate locking engagement of the aperture 24 with the pin of the trailer. In operation of the fifth wheel device 2, the fork lift T is backed up to and aligned with the front end of the trailer vehicle which is conventionally supported adjacent the front end by means of jacks, (not shown) when in a stored position. Generally, the brakes of the vehicle are in the applied condition when the trailer vehicle is being stored, and thus, will normally be in the applied condition at this point of the operation. If the brakes have not been applied, then they should be applied at this time. The fork lift truck T is then moved into engagement with the trailer vehicle so that the fifth wheel member 16 can be connected to the connector pin 28 (FIG. 1) which projects downwardly from the under side of the trailer vehicle. A typical operation of the fifth wheel device for locking engagement with the trailer vehicle is generally conventional in the art, as more fully described in U.S. Pat. No. 3,677,563.

Referring to FIG. 4 of the drawings, the frame 10 includes a pair of spaced apart, outwardly disposed compartmentlike track members 30 which are constructed and arranged to slidably receive therein the support arms 4 of the fork lift truck, for example, as shown, the tracks are of a polygonal, such as rectangular figuration, in transverse cross-section and extend lengthwise (FIG. 3) of the frame 10. Preferably, the tracks 30 extend somewhat in laterally off-set relation lengthwise of the frame 10 and are of a length sufficient to accommodate a major portion (e.g., 50 percent) of the length of the support arms 4, as best seen in FIG. 1. The track members 30, in effect, define elongated channels which are open at the opposed ends so as to allow the terminal distal end, as at 32, of the support arm 4 to extend therethrough, as desired. In the form shown, each of the members 30 is provided with a pair of friction members, as at 34, 36, which may be detachably secured thereto by suitable bolts, as at 38, so as to extend lengthwise from the top wall of the members 30. Preferably, the friction members 34, 36 are comprised of a high strength, friction material for frictional engagement with the confronting surface of the support arms, as seen in FIG. 5. For example, such members may be made of a reinforced rubber material, such as tire cord, or the like, or from a suitable particle board material. Preferably, the member 34, 36 extend the full length of the tracks 30 so as to provide a positive holding engagement with the support arms 4. Especially in FIG. 7, the track members 30 are defined by opposed parallel side walls 40 and opposed parallel top and bottom walls 42 which are integrally joined together to provide the channel shown. The bottom wall 42 is preferably provided with an opening, as at 44, so as to slidably receive therethrough a fluid piston means, designated generally at 50.

Figure 8:
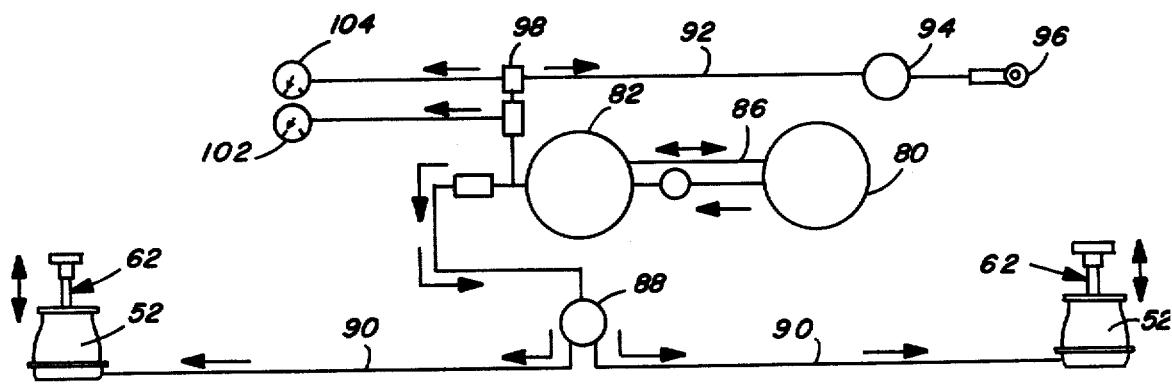
FIG. 8 is a schemmatic illustration of the fluid system for actuating the fifth wheel device of the invention.

In the form shown, the fluid piston means 50 includes a fluid pressure motor, designated generally at 52, which may be of the diaphragm type pneumatic brake chambers. In such chambers, there is generally provided a dome-shaped diaphragm and a housing generally corresponding cylindrical dome-shape fitted closely to the cylindrical lateral wall of the diaphragm, as disclosed for example in U.S. Pat. No. 3,235,221. Accordingly, upon application of fluid pressure (e.g., pneumatic) to the chamber 52, the stub shaft 54 is caused to reciprocate vertically in accordance with control from the control system, as illustrated in FIG. 8. As shown, the stub shaft 54 is threadably connected, as at 56, to an elongated piston member 58 which is disposed for reciprocal movement within a cylindrical sleeve 60. The piston is preferably rounded, as at 52, at its free end for abutting engagement with a brake member, designated generally at 64. In the form shown, the brake member 64 includes an oblate shaped collar member 66 (FIG. 6) which is made integral, such as by weldments, to the under side of a plate 68 which, in turn, is secured such as by weldments to the under side of a bracket plate 70, as best seen in FIG. 5. The bracket plate 70, in turn, is detachably connected, as by bolts 72, to a brake shoe member 74, for reciprocal movement through the opening 44 provided in the bottom plate 42 of the track member 30. Accordingly, upon actuation of the pneumatic brake chamber 52, the piston member 58 moves the brake shoe vertically through the opening 44 and into interlocking coacting friction engagement with the confronting under surface of the support arms 4.

Figure 7:
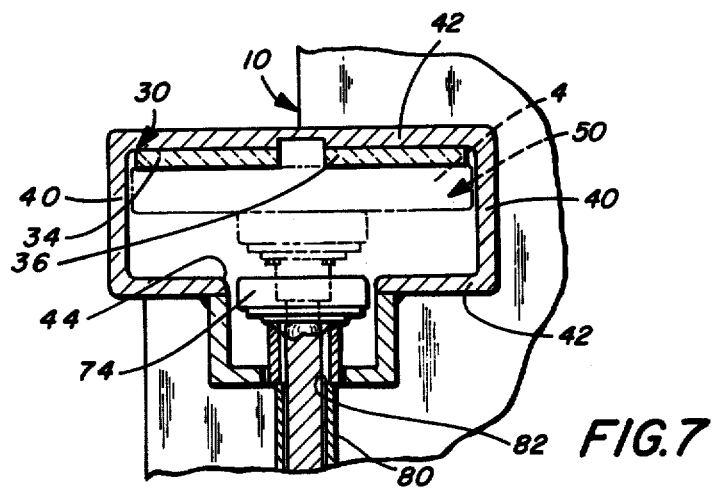
FIG. 7 is a fragmentary, enlarged vertical section view along line 7—7 of FIG. 5 of the locking means of the invention.

In the invention, the piston 58 is preferably of a cylindrical construction, whereas, the collar member 66 is preferably of an oblate construction in transverse section to enable controlled pivotal or tilting movement of the brake shoe 74 upon engagement with the confronting under side of the support arm 4, as illustrated in dotted line at FIG. 5. This feature is particularly important by reason of the fact that the underside of the support arms 4 are generally tapered or inclined, as at 76. Moreover, tilting movement of the brake shoe 74 insures a positive surface-to-surface friction engagement with the confronting under side of the support arms 4. The brake shoes 74 are similarly preferably made from a high-strength, friction material, such as a fabric reinforced rubber, friction particle board, or the like. As best seen in FIG. 7, the brake shoe member 74 has a widthwise dimension slightly less than the corresponding widthwise dimension of the opening 44 in the bottom plate 42 so as to prevent rotational movement of the brake shoe about the vertical axis of piston member 58 in the lowered position, as shown in solid lines. Moreover, the collar member 66 is dimensioned so as to abut against a stop plate 80 in the lowered position, as at 82, so that the exposed upper surface of the brake shoe 74 is disposed substantially flush or in the general plane of the bottom plate 42 to facilitate unobstructed slidable insertion of the support arms 4 interiorly of the track 30.

Figure 3:
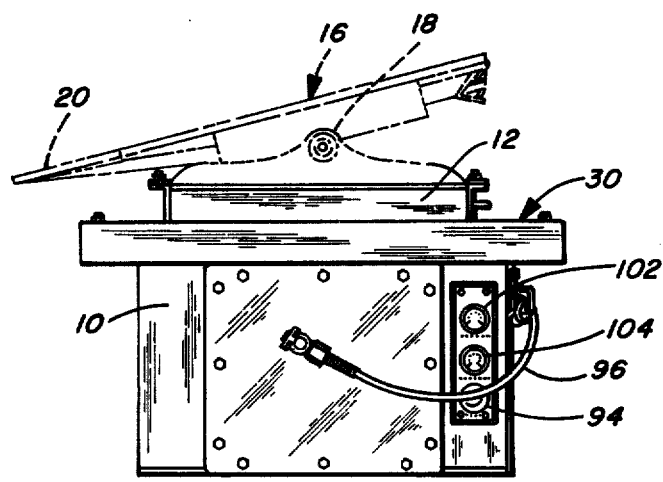
FIG. 3 is a side elevation view of the fifth wheel device of the invention.

In FIG. 8 there is illustrated a typical type pneumatic system for selectively controlling actuation of the brake chamber 52 and for selectively actuating the brakes on the trailer vehicle 6. In the form shown, the system generally includes a pneumatic air compressor 80 which delivers air under pressure, such as at 150 P.S.I. to an air tank 82. A safety valve 84 may be provided in the line together with a second line 86 for maintaining a constant pressure in the tank 82. Accordingly, a bleeder valve 88 may be provided in the line for directing pneumatic pressure via conduits 90 at a constant continuous pressure (e.g., 150 P.S.I.) to the brake chambers 52 for actuating the respective piston member 58. Another conduit 92 may extend from the air tank 82 via a bleeder valve 94 for communication with an air hose 96 having a suitable coupling for connection to the brake system of the trailer vehicle for actuating the brake system thereof. Accordingly, the pressure may be delivered from the tank 82 via the breeder valve 94 at a reduced pressure, such as 90 P.S.I. sufficient for operating the brake system of the trailer vehicle. Moreover, a regular valve 98 may be provided in the conduit 92 for controlling the delivery of reduced pressure to the trailer vehicle brake system. Accordingly, the system may be provided with one guage 102 for indication of the 150 P.S.I. pressure to the brake chambers 52 while another guage 104 may be provided for indicating the 90 P.S.I. delivered to the trailer brake system. Such guages 102 and 104 together with the bleeder valve 94 may be mounted in a suitable console on one of the sides of the frame 10, as illustrated in FIG. 3. Accordingly, it will be seen that the fifth wheel device 2 of the invention provides a portable, self-contained unit which can be effectively employed for detachable connection to a tractor vehicle, such as a fork lift truck, for detachable connection, in turn, with a trailer vehicle for moving the latter to or from any given location while, at the same time, providing a controllable pneumatic system for actuating the parts and the brake system on the trailer vehicle, as desired.

I claim:

1. A portable, self-contained fifth wheel device for detachable mounting on a vehicle, such as a fork lift truck or the like, for towing a wheeled container, such as a trailer, comprising, a frame for detachable connection on a wheeled vehicle of the type having at least one support arm, said frame including a pivotally mounted fifth wheel for detachable connection to a wheeled container, said frame having at least one interlocking means including a hollow housing for receiving said support arm, said housing including a fluid actuated lock means for selective locking engagement with said support arm, said fluid actuated lock means includes a brake member supported by said frame for movement within said housing, and fluid power means operatively connected to said lock means for selectively moving said brake member into engagement with said support arm within said housing for clamping said support arm to said frame to enable said wheeled container to be connected to said fifth wheel and supportably mounted on said vehicle.

2. A fifth wheel device in accordance with claim 1, including fluid pressure means for selectively actuating the brake
system of said wheeled container.

3. A fifth wheel device in accordance with claim 2, including regulator means for selectively controlling the fluid
pressure transmitted to said fluid pressure means.

4. A fifth wheel device in accordance with claim 1, including a regulator means for regulating the pressure to said
fluid power means.

5. A fifth wheel device in accordance with claim 1, wherein
said hollow housing is of a polygonal configuration, in cross-section, defining track for slidably receiving said support arm,
said housing being open at both ends and having an opening in the bottom for receiving said lock means therethrough.

6. A fifth wheel device in accordance with claim 1, wherein
said frame has at least one pair of spaced-apart, oppositely disposed housings for receiving a corresponding pair of support arms therein,
said fluid actuated lock means includes a fluid actuated piston member disposed for reciprocal movement in each of said housings,
each of said piston members has a brake member mounted on its free end for locking engagement with the corresponding support arm disposed in its associated housing, and
said fluid power means is operably connected to each of said piston members for selectively actuating said piston members to move said brake members into clamping engagement with said support arms.

7. A fifth wheel device in accordance with claim 6, including
stop means for limiting reciprocable movement of said piston member.

8. A fifth wheel device in accordance with claim 6, wherein
each of said housings includes an elongated, hollow channel, and
each of said channels includes a friction member secured thereto in confronting relation to a respective one of said brake members for clamping said support arms therebetween.

9. A fifth wheel device in accordance with claim 1, wherein
said brake member is pivotally mounted on said piston member so that its brake surface may be oriented for generally flush contact with the confronting surface of said support arm.

10. A fifth wheel device in accordance with claim 9, wherein
said brake member comprises a bracket plate having a brake shoe mounted thereon for contact with said support arm,
said bracket plate is mounted at one end of an elongated collar member disposed in telescopic relation over one end of said piston member, and
said collar member is of an oblate configuration in transverse cross section to enable pivotal movement of said brake member in the direction of the major axis of said collar member and facilitates clamping contact of said brake member with said support arm.

11. A fifth wheel device in accordance with claim 1, wherein
said lock means includes a fluid-actuated piston member operably connected to said brake member,
said brake member being mounted at the free end of said piston member for coacting frictional engagement with said support arm, and
said fluid power means is operably connected to the opposite end of said piston member for selectively moving said brake member into engagement with said support arm for clamping said support arm to said frame.

12. A fifth wheel device in accordance with claim 11, wherein
said fluid power means comprises a fluid cylinder, and
said piston member is operably connected to said fluid cylinder for reciprocating movement within said housing for moving said brake member into clamping engagement with said support arm.

13. A fifth wheel device in accordance with claim 1, wherein
said housing comprises an elongated, hollow channel, and
said channel includes a friction member secured thereto in confronting relation with respect to said brake member for clamping said support arm therebetween.

14. A fifth wheel device in accordance with claim 1, wherein
said fluid pressure means comprises a self-contained air compressor unit mounted on said frame.

15. A portable, self-contained fifth wheel device for detachably mounting a vehicle, such as a fork lift truck or the like, for towing a wheeled container, such as a trailer, comprising,
a frame for detachable connection on a wheeled vehicle of the type having a pair of support arms,
a fifth wheel pivotally mounted on said frame for detachable connection to a wheeled container,
said frame including a pair of spaced, elongated hollow channels for receiving said support arms therein,
a fluid actuated lock means supported by said frame for selective locking engagement with said support arms when disposed in said channels, a fluid pressure means on said frame for selectively actuating said lock means and the braking system of said wheeled container to release the brakes of said wheeled container that it can be towed by said vehicle when said device is locked to said support arms, said lock means includes a fluid actuated piston member disposed for reciprocal movement in each of said channels, each of said piston members includes a brake member pivotally mounted at its free end for clamping engagement with the respective one of said support arms disposed in said channel, and fluid power means operably connected to each of said piston members for moving said brake members into frictional engagement with said support arms when in said channels to clamp said support arms to said frame for locking said device on said vehicle.

* * * * *